United States Patent
Hatano et al.

(10) Patent No.: US 7,548,402 B2
(45) Date of Patent: Jun. 16, 2009

(54) HIGH VOLTAGE PULSE GENERATING CIRCUIT

(75) Inventors: Tatsuhiko Hatano, Kasugai (JP); Takeshi Sakuma, Nagoya (JP)

(73) Assignee: NGK Insulators, Ltd., Nagoya (JP)

(*) Notice: Subject to any disclaimer, the term of this patent is extended or adjusted under 35 U.S.C. 154(b) by 459 days.

(21) Appl. No.: 11/579,539

(22) PCT Filed: May 13, 2005

(86) PCT No.: PCT/JP2005/008793
§ 371 (c)(1),
(2), (4) Date: Nov. 3, 2006

(87) PCT Pub. No.: WO2005/112246
PCT Pub. Date: Nov. 24, 2005

(65) Prior Publication Data
US 2007/0241619 A1 Oct. 18, 2007

(30) Foreign Application Priority Data
May 14, 2004 (JP) .............................. 2004-145197

(51) Int. Cl.
*H02H 3/00* (2006.01)
(52) U.S. Cl. ....................................................... 361/86
(58) Field of Classification Search ....................... 361/86
See application file for complete search history.

(56) References Cited

U.S. PATENT DOCUMENTS

| 6,008,564 A | 12/1999 | Takayoshi et al. |
| 6,841,124 B2* | 1/2005 | Chien et al. ..................... 422/3 |
| 7,084,528 B2* | 8/2006 | Hatano et al. ................ 307/106 |
| 2003/0230938 A1 | 12/2003 | Hatano et al. |

FOREIGN PATENT DOCUMENTS

| JP | A 5-276739 | 10/1993 |
| JP | A 10-215587 | 8/1998 |
| JP | A 10-295078 | 11/1998 |
| JP | A 2002-112452 | 4/2002 |
| JP | A 2004-72994 | 3/2004 |

* cited by examiner

Primary Examiner—Stephen W Jackson
Assistant Examiner—Ann T Hoang
(74) Attorney, Agent, or Firm—Oliff & Berridge, PLC

(57) ABSTRACT

In a high voltage pulse generating circuit, inductive energy is accumulated in an inductor due to electrical continuity of a first semiconductor switch by turning on a second semiconductor switch, and a high voltage pulse is generated by the inductor due to turning off of the first semiconductor switch by turning off the second semiconductor switch. In the case where both edge voltages of the first semiconductor switch and the second semiconductor switch are off the normal range, a failure diagnosis circuit is provided for stopping drive of the second semiconductor switch.

8 Claims, 7 Drawing Sheets

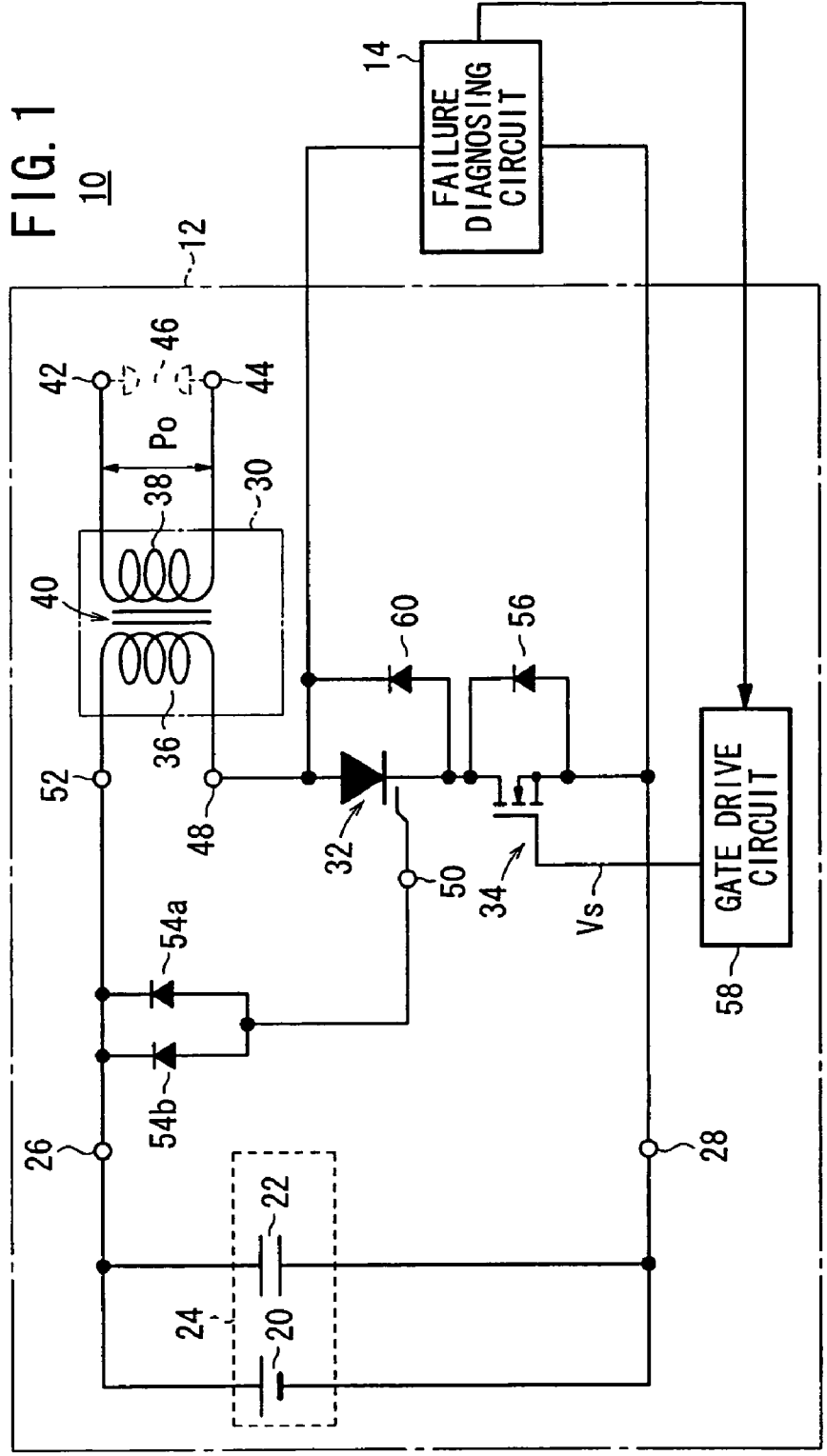

HIGH VOLTAGE PULSE GENERATING CIRCUIT

This application is based upon and claims the benefit of priority from Patent Application No. 2004-145197 filed on May 14, 2004, in the Japanese Patent Office, of which the contents are incorporated herein by reference.

TECHNICAL FIELD

The present invention relates to a high-voltage pulse generating circuit which is capable of supplying a high-voltage pulse having an extremely short rise time and an extremely short pulse duration and of promptly detecting a failure of a component circuit thereof.

BACKGROUND ART

Technologies for deodorization, sterilization, and toxic gas decomposition based on a plasma developed by high-voltage pulse discharges have recently been put to use. To generate such a plasma, a high-voltage pulse generating circuit capable of supplying pulses of an extremely short duration and a high voltage is required.

There has heretofore been proposed a high-voltage pulse generating circuit as disclosed in Patent Document 1, for example. As shown in FIG. 7, the proposed high-voltage pulse generating circuit 200 has a simple circuit arrangement including an inductor 204, a first semiconductor switch 206, and a second semiconductor switch 208 which are connected in series across a DC power supply unit 202. The first semiconductor switch 206 has an anode connected to an end of the inductor 204, whose other end is connected to the cathode of a diode 210. The diode 210 has an anode connected to the gate terminal of the first semiconductor switch 206.

When the second semiconductor switch 208 is turned on, the first semiconductor switch 206 is rendered conductive, applying the voltage from the DC power supply unit 202 to the inductor 204, storing induced energy in the inductor 204. When the second semiconductor switch 208 is thereafter turned off, since the first semiconductor switch 206 is quickly turned off, developing a sharply rising extremely narrow high-voltage pulse Po across the inductor 204. Therefore, a high-voltage pulse Po appears between output terminals 212, 214 of the inductor 204.

The high-voltage pulse generating circuit 200 is of a simple circuit arrangement which is capable of supplying the high-voltage pulse Po which has a sharp rising time and an extremely short pulse duration without the need for a plurality of semiconductor switches to which a high voltage is applied.

Patent Document 1: Japanese Laid-Open Patent Publication No. 2004-72994

DISCLOSURE OF THE INVENTION

Problems to be Solved by the Invention

Since the voltage applied to the first semiconductor switch 206 largely depends on the load connected between the output terminals 212, 214, if there is an open circuit between the output terminals 212, 214, then when the first semiconductor switch 206 is turned off, a high voltage (excessive voltage) may be applied to destroy the first semiconductor switch 206. In such a case, a snubber circuit may be connected in parallel with the first semiconductor switch 206.

If the first semiconductor switch 206 is short-circuited for some reason, then a failure may occur as described below.

When the first semiconductor switch 206 is short-circuited, the energy stored in the exciting inductance of the inductor 204 is consumed by the diode 210, which is heated, thermally destroyed, and short-circuited. When the diode 210 is short-circuited, an excessive current flows through the second semiconductor switch 208, and the high-voltage pulse generating circuit 200 fails to function. The short-circuit failure of the first semiconductor switch 206 thus causes a failure of another component circuit, which then spreads to other components.

The present invention has been made in view of the above problems. It is an object of the present invention to provide a high-voltage pulse generating circuit which is capable of promptly detecting a short-circuit failure of a first semiconductor switch and avoiding a failure of another component circuit and the spreading of the failure to other components.

A high-voltage pulse generating circuit according to the present invention has an inductor, a first semiconductor switch, and a second semiconductor switch which are connected in series with each other across a DC power supply unit, and a diode having a cathode terminal connected to an end of the inductor whose other end is connected to an anode terminal of the first semiconductor switch, and an anode terminal connected to a gate terminal of the first semiconductor switch, wherein an induced energy is stored in the inductor when the first semiconductor switch is rendered conductive as the second semiconductor switch is turned on, and the inductor generates a high-voltage pulse when the first semiconductor switch is turned off as the second semiconductor switch is turned off, characterized by a failure diagnosing circuit for de-energizing the second semiconductor switch if the voltage across the first semiconductor switch and the second semiconductor switch falls out of a normal range.

When the first semiconductor switch fails, the voltage across the first semiconductor switch and the second semiconductor switch drops. If the voltage falls out of the normal range, then the second semiconductor switch is de-energized, and the high-voltage pulse generating circuit itself stops operating.

According to the present invention, therefore, even if the first semiconductor switch suffers a short-circuit failure for some reason, the high-voltage pulse generating circuit is capable of promptly detecting the short-circuit failure. The energy stored in the exciting inductance of the inductor is prevented from being kept consumed by the diode, the diode is prevented from being heated and thermally destroyed, and no excessive current flows through the second semiconductor switch. Accordingly, other component circuits are prevented from failing due to the short-circuit failure of the first semiconductor switch, and the failure does not spread to other components.

The high-voltage pulse generating circuit which is constructed as described above may have a drive circuit for turning on and off the second semiconductor switch at a predetermined switching frequency based on a switching command signal applied thereto. The failure diagnosing circuit may inhibit the switching command signal from being applied to the drive circuit if the voltage across the first semiconductor switch and the second semiconductor switch falls out of the normal range.

The above arrangement is effective when the first semiconductor switch suffers a short-circuit failure while a high-voltage pulse having an extremely short pulse period and an extremely short pulse duration is being output.

In the above arrangement, the failure diagnosing circuit may comprise a detecting circuit for detecting the voltage across the first semiconductor switch and the second semiconductor switch, a determining circuit for comparing a detected voltage from the detecting circuit with a preset prescribed voltage, outputting an energization signal if the detected voltage is higher than the prescribed voltage, and outputting a de-energization signal if the detected voltage is equal to or lower than the prescribed voltage, and a gate circuit for inhibiting the switching command signal from being applied to the drive circuit based on the de-energization signal applied thereto from the determining circuit. The failure diagnosing circuit may thus be of an extremely simple circuit arrangement.

The detecting circuit may comprise a voltage-clamping snubber circuit having a snubber diode and a snubber capacitor which are connected in series with each other across the first semiconductor switch and the second semiconductor switch, and a surge absorber connected parallel to the snubber capacitor. The detecting circuit may extract a voltage across the snubber capacitor or the surge absorber as the detected voltage.

Since the snubber circuit for preventing an excessive voltage from being applied to the first semiconductor switch is used, an excessive voltage can be avoided and a short-circuit failure can be detected. Therefore, the high-voltage pulse generating circuit which is highly safe is provided.

In the above arrangement, the high-voltage pulse generating circuit may have a second gate circuit for transmitting an output from the determining circuit to the gate circuit from an operation start time of the high-voltage pulse generating circuit based on an operation command signal applied thereto to an operation stop time of the high-voltage pulse generating circuit. The determining circuit may have an adjusting circuit for forcibly outputting the drive signal for a predetermined time from the operation start time of the high-voltage pulse generating circuit based on the operation command signal applied thereto.

Even when the high-voltage pulse generating circuit is normal, since the voltage across the first semiconductor switch and the second semiconductor switch is equal to or lower than the prescribed voltage at the operation start time, the determining circuit may possibly judge a short-circuit failure in error. The erroneous short-circuit failure is avoided by forcibly outputting the drive signal from the adjusting circuit for the predetermined time, e.g., a time until a normal high-voltage pulse generating circuit normally operates, from the operation start time.

The first semiconductor switch may be a static induction thyristor. The second semiconductor switch may be a power metal oxide semiconductor field-effect transistor.

As described above, the high-voltage pulse generating circuit according to the present invention is capable of promptly detecting a short-circuit failure of the first semiconductor switch and avoiding a failure of another component circuit and the spreading of the failure to other components.

BRIEF DESCRIPTION OF THE DRAWINGS

FIG. 1 is a circuit diagram showing an arrangement of a high-voltage pulse generating circuit according to an embodiment of the present invention;

BEST MODE FOR CARRYING OUT THE INVENTION

Figure 2A:
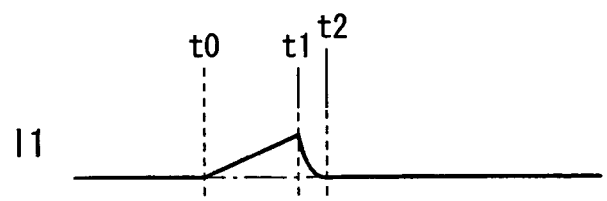
FIGS. 2A through 2D are diagrams showing the operating waveforms of voltages and currents in the high-voltage pulse generating circuit according to the embodiment of the present invention.
Figure 2B:
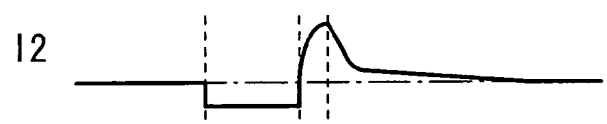
Figure 2C:
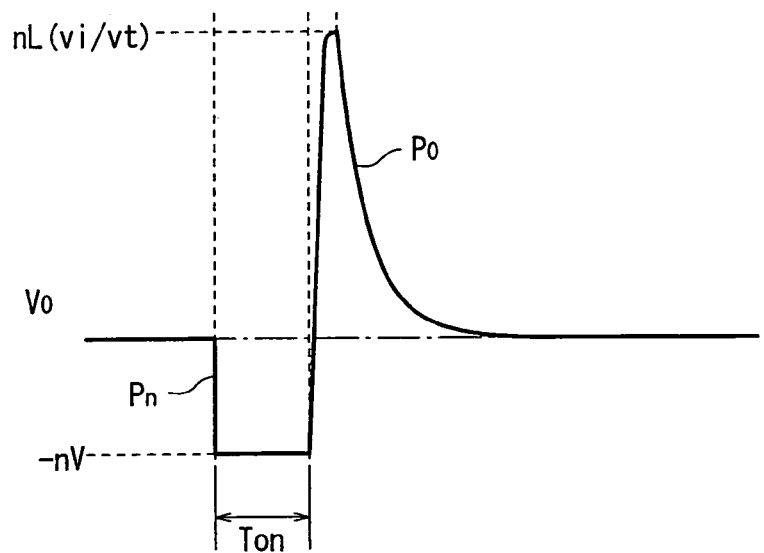
Figure 2D:

A high-voltage pulse generating circuit according to an embodiment of the present invention will be described below with reference to FIGS. 1 through 6.

The high-voltage pulse generating circuit 10 according to the embodiment of the present invention has a main circuit 12 and a failure diagnosing circuit 14. The failure diagnosing circuit 14 will be described later.

As shown in FIG. 1, the main circuit 12 has a DC power supply unit 24 having a DC power supply 20 and a capacitor 22 for lowering a high-frequency impedance, and an inductor 30, a first semiconductor switch 32, and a second semiconductor switch 34 that are connected in series between terminals 26, 28 of the DC power supply unit 24.

The inductor 30 includes a transformer 40 having a primary winding 36 and a secondary winding 38. The transformer 40 produces a high-voltage pulse Po between terminals 42, 44 (output terminals) of the secondary winding 38 thereof. A discharge gap 46 indicated by the broken lines or a resistive load, not shown, is connected between the output terminals 42, 44 of the secondary winding 38. The first semiconductor switch 32 has an anode terminal connected to an end 48 of the inductor 30 (an end of the primary winding 36).

Two parallel-connected diodes 54a, 54b are connected between a gate terminal 50 of the first semiconductor switch 32 and another end 52 of the inductor 30. The two diodes 54a, 54b have respective anode terminals connected through a common contact to the gate terminal 50 of the first semiconductor switch 32 and respective cathode terminals connected to the other end 52 of the inductor 30 (the other end of the primary winding 36).

In FIG. 1, the second semiconductor switch 34 is connected to the negative terminal 28 of the DC power supply unit 24. However, the second semiconductor switch 34 may be connected to the positive terminal 26 of the DC power supply unit 24. An output voltage of the high-voltage pulse generating circuit 10 may be extracted from across the first semiconductor switch 32, rather than the inductor 30.

The second semiconductor switch 34 may comprise a self-extinguishing or commutation-extinguishing device. In the illustrated embodiment, the second semiconductor switch 34 comprises a power metal oxide semiconductor field-effect transistor incorporating avalanche diodes 56 held in anti-parallel connection. A gate drive circuit 58 supplies a switching pulse signal Vs between the gate and source terminals of the second semiconductor switch 34. The gate drive circuit 58 may comprise an amplifier for amplifying an input signal, an inverter, or the like.

The first semiconductor switch 32 may comprise a current-controlled device or a self-extinguishing or commutation-extinguishing device. In the illustrated embodiment, the first semiconductor switch 32 comprises an SI thyristor that is highly resistant to a voltage increasing ratio (dv/dt) when it is turned off and has a high voltage rating.

In this embodiment, the first semiconductor switch 32 is shunted by a diode 60 connected in parallel with the first semiconductor switch 32. The diode 60 has an anode terminal and a cathode terminal that are connected respectively to the cathode terminal and the anode terminal of the first semiconductor switch 32. Therefore, the diode 60 is held in antiparallel connection to the first semiconductor switch 32.

Operation of the main circuit 12 will be described below with reference to FIG. 1 and FIGS. 2A through 2D.

At time t0, the switching pulse signal Vs supplied between the gate and source of the second semiconductor switch 34 goes high (see FIG. 2D), turning on the second semiconductor switch 34.

Because of the extremely high opposite-polarity impedance of the diodes 54a, 54b, the first semiconductor switch 32 is turned on by a field effect positively applied between the gate and cathode of the first semiconductor switch 32. Since an anode current of the first semiconductor switch 32 is prevented from rising by the inductor 30, the first semiconductor switch 32 is normally turned on solely by the field effect.

When the second semiconductor switch 34 and the first semiconductor switch 32 are turned on at time t0, a voltage which is the same as the voltage V of the DC power supply 20 is applied to the transformer 40. If the primary inductance of the transformer 40 is represented by L, then a current I1 flowing through the primary winding 36 of the transformer 40 linearly increases at a gradient (V/L) with time, as shown in FIG. 2A.

In a period Ton during which the first semiconductor switch 32 is turned on, a constant negative-polarity voltage (negative pulse Pn: see FIG. 2C) is output between the output terminals 42, 44 of the secondary winding 38. If the power supply voltage of the DC power supply 20 is represented by V and the turn ratio of the transformer 40 (the number n2 of turns in the secondary winding 38/the number n1 of turns in the primary winding 36) is represented by n, then the level of the output voltage Vo appearing between the output terminals 42, 44 of the secondary winding 38 is represented by −nV (Vo=−nV (see FIG. 2C)). In the period Ton, a current I2 flowing through the secondary winding 38 is of a waveform similar to the negative pulse Pn (see FIG. 2B).

Thereafter, at time t1, the switching pulse signal Vs (see FIG. 2D) goes low, turning off the second semiconductor switch 34. When the second semiconductor switch 34 is turned off, the current from the cathode of the first semiconductor switch 32 is reduced to zero, i.e., an open state. Therefore, the current I1 flowing through the primary winding 36 is cut off, and the primary winding 36 tends to generate a reverse induced voltage based on the remaining electromagnetic energy. Due to the diodes 54a, 54b, the current I1 that has flowed through the primary winding 36 flows circulatively through a path extending from the anode terminal of the first semiconductor switch 32 to the gate terminal 50 of the first semiconductor switch 32 to the anodes of the diodes 54a, 54b to the cathodes of the diodes 54a, 54b. At this time, a high-voltage pulse Po starts being generated between the output terminals 42, 44, and the output voltage Vo sharply rises due to an induced electromotive force induced by the transformer 40 (see FIG. 2C). When the first semiconductor switch 32 is turned off and the current I1 is reduced to zero at time t2, the high-voltage pulse Po has a peak.

The peak value of the high-voltage pulse Po is expressed by nL1 (di/dt) where n represents the turn ratio of the transformer 40, L the primary inductance of the transformer 40, and (di/dt) the rate at which the current I1 flowing through the primary winding 36 of the transformer 40 is cut off. If the anode-to-cathode voltage of the first semiconductor switch 32 is represented by $V_{AK}$, then the peak value of the high-voltage pulse Po is represented by $nV_{AK}$, which is higher than the resistance against the anode-to-cathode voltage $V_{AK}$ of the first semiconductor switch 32. The pulse duration Tp of the high-voltage pulse Po is expressed by the equation (1):

$$TP \approx \pi\sqrt{LC},$$

wherein C represents a capacity equivalent to all electric capacity of the first semiconductor switch 32.

If the discharge gap 46 is connected between the output terminals 42, 44, then an electric discharge occurs at time t2 when the high-voltage pulse Po has the peak. If an energy remains to be consumed by the discharge gap 46 (including an energy to move from the secondary winding 38) at time t2, then a current due to the remaining energy flows through a path from the primary winding 36 to the DC power supply unit 24 to the diode 56 across the second semiconductor switch 34 to the diode 60 across the first semiconductor switch 32 to the primary winding 36. This flow of the current provides a regenerative action to regenerate the energy remaining in the primary winding 36, greatly contributing to an increase in the operation efficiency.

The high-voltage pulse generating circuit 10 according to the present embodiment is thus of a simple circuit arrangement which is capable of supplying a high-voltage pulse Po having an extremely short rise time and an extremely short pulse duration.

The high-voltage pulse generating circuit 10 according to the present embodiment has the failure diagnosing circuit 14 in addition to the main circuit 12.

The failure diagnosing circuit 14 has a function to de-energize the second semiconductor switch 34 when the voltage across the first semiconductor switch 32 and the second semiconductor switch 34 falls out of a normal range. Specifically, when the voltage across the first semiconductor switch 32 and the second semiconductor switch 34 falls out of the normal range, the failure diagnosing circuit 14 inhibits the switching pulse signal Vs from being input to the gate drive circuit 58.

Figure 3:
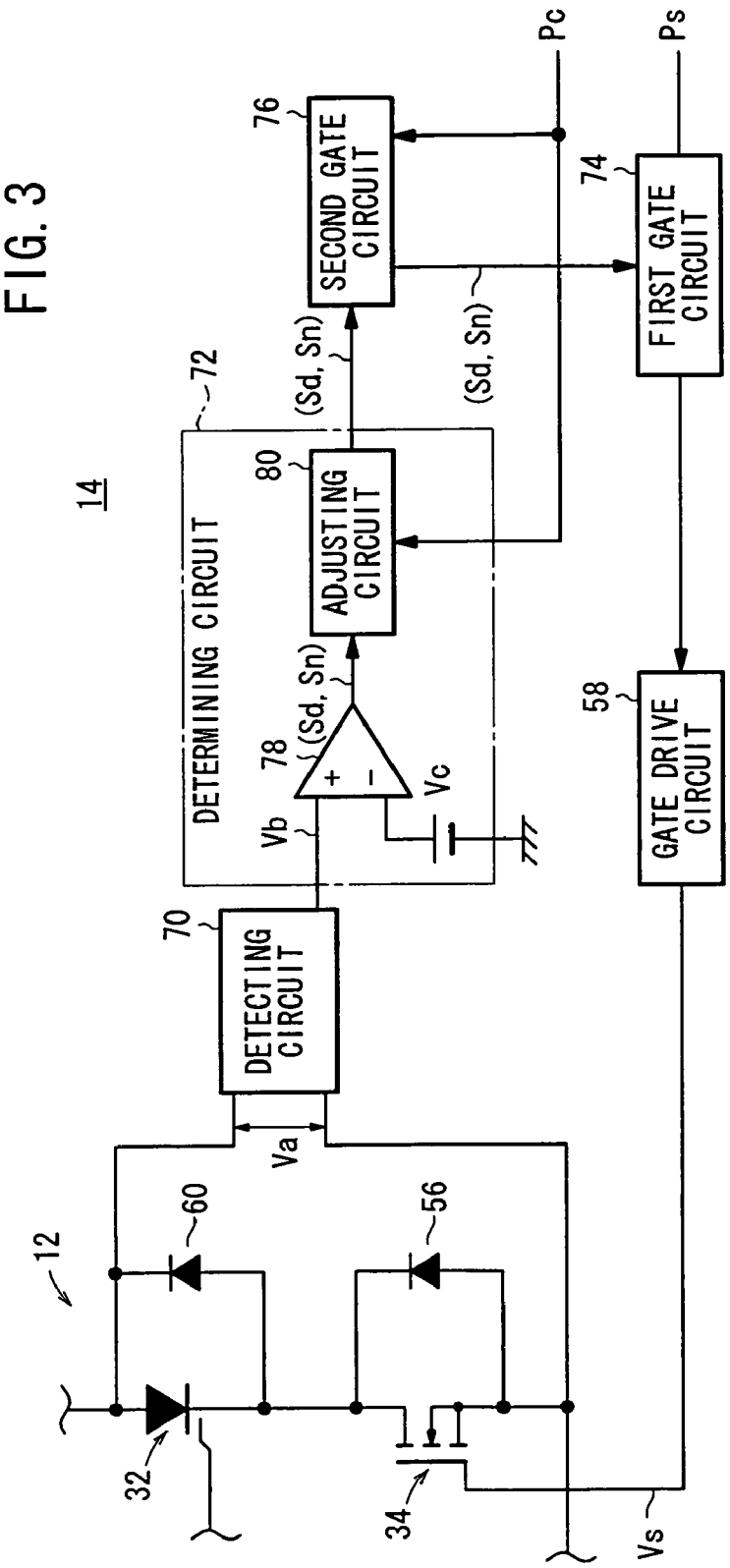
FIG. 3 is a circuit diagram showing a failure diagnosing circuit of the high-voltage pulse generating circuit according to the embodiment of the present invention.

As shown in FIG. 3, the failure diagnosing circuit 14 has a detecting circuit 70, a determining circuit 72, a first gate circuit 74, and a second gate circuit 76. The gate drive circuit amplifies a switching pulse signal Ps applied thereto at a predetermined gain, and supplying the amplified switching pulse signal as the switching pulse signal Vs between the gate and source of the second semiconductor switch 34.

The detecting circuit 70 detects a voltage Va across the first semiconductor switch 32 and the second semiconductor switch 34, and outputs the detected voltage Va as a detected voltage Vb. The determining circuit 72 has a comparing circuit 78 for comparing the detected voltage Vb from the detecting circuit 70 with a preset prescribed value Vc. If the detected voltage Vb is higher than the prescribed value Vc, then the comparing circuit 78 outputs an energization signal Sd. If the detected voltage Vb is equal to or lower than the prescribed value Vc, then the comparing circuit 78 outputs a de-energization signal Sn.

The first gate circuit 74 inhibits the switching command signal Ps from being input to the gate drive circuit 58 based on the de-energization signal Sn applied from the determining circuit 72. The second gate circuit 76 is connected between the determining circuit 72 and the first gate circuit 74, and transmits the output from the determining circuit 72 to the first gate circuit 74 from an operation start time of the high-voltage pulse generating circuit 10 based on an operation command signal Pc applied thereto to an operation stop time of the high-voltage pulse generating circuit 10. The operation command signal Pc is a signal for energizing and de-energizing the high-voltage pulse generating circuit 10, and is supplied from a control computer, for example.

The determining circuit 72 has, in addition to the comparing circuit 78, an adjusting circuit 80 for forcibly outputting an energization signal Sd for a predetermined time td from the operation start time of the high-voltage pulse generating circuit 10 based on the operation command signal Pc applied thereto. The predetermined time td may be a time required until the normal high-voltage pulse generating circuit 10 normally operates from the operation start time, for example.

Circuit operation of the failure diagnosing circuit 14 will be described below. When the operation command signal Pc supplied to the adjusting circuit 80 and the second gate circuit 76 reaches a level indicative of energization, the adjusting circuit 80 forcibly outputs the energization signal Sd for the predetermined time td, and the energization signal Sd is supplied through the second gate circuit 76 to the first gate circuit 74.

The first gate circuit 74 outputs the supplied switching command signal Ps to the gate drive circuit 58 based on the energization signal Sd supplied from the second gate circuit 76. The gate drive circuit 58 amplifies the supplied switching command signal Ps at a predetermined gain, and supplying the amplified switching command signal as the switching pulse signal Vs between the gate and source of the second semiconductor switch 34. The main circuit 12 is now put into operation.

After elapse of the predetermined time td, insofar as the main circuit 12 normally operates, the voltage Va across the first semiconductor switch 32 and the second semiconductor switch 34 is in the normal range. Therefore, the determining circuit 72 continuously outputs the energization signal Sd, supplying the switching pulse signal Vs to the second semiconductor switch 34. When the operation command signal Pc reaches a level indicative of de-energization, the second gate circuit 76 inhibits the energization signal Sd from the determining circuit 72 from being supplied to the first gate circuit 74. The switching pulse signal Vs is inhibited from being supplied to the second semiconductor switch 34, de-energizing the main circuit 12. When the operation command signal Pc reaches the level indicative of energization again, the main circuit 12 resumes its operation as described above.

After elapse of the predetermined time td, if the first semiconductor switch 32 of the main circuit 12 suffers a short-circuit failure, then the voltage Va across the first semiconductor switch 32 and the second semiconductor switch 34 drops, and hence the detected voltage Vb from the detecting circuit 70 also drops. When the detected voltage Vb becomes equal to or lower than the prescribed voltage Vc, the determining circuit 72 outputs the de-energization signal Sn. The first gate circuit 74 inhibits the supplied switching command signal Ps from being output to the gate drive circuit 58. The main circuit 12 is now de-energized.

As described above, even if the first semiconductor switch 32 suffers a short-circuit failure for some reason, the high-voltage pulse generating circuit 10 according to the present embodiment is capable of promptly detecting the short-circuit failure and de-energizing the main circuit 12. The energy stored in the exciting inductance of the inductor 30 is prevented from being kept consumed by the diodes 54a, 54b, the diodes are prevented from being thermally destroyed, and no excessive current flows through the second semiconductor switch 34. Accordingly, other component circuits are prevented from failing due to the short-circuit failure of the first semiconductor switch 32, and the failure does not spread to other components.

According to the present embodiment, when the detected voltage Vb from the detecting circuit 70 becomes equal to or lower than the prescribed voltage Vc, the switching command signal Ps is inhibited from being input to the gate drive circuit 58. Therefore, the high-voltage pulse generating circuit 10 is effectively applicable where the first semiconductor switch 32 suffers a short-circuit failure while the high-voltage pulse Po having an extremely short pulse period and an extremely short pulse duration is being output.

According to the present embodiment, particularly, the determining circuit 72 incorporates the adjusting circuit 80. Even when the high-voltage pulse generating circuit 10 is normal, since the detected voltage Vb from the detecting circuit 70 is equal to or lower than the prescribed voltage Vc at the operation start time, the determining circuit 72 may possibly judge a short-circuit failure in error. The erroneous short-circuit failure is avoided because the adjusting circuit 80 forcibly outputs the drive signal Sd for the predetermined time td from the operation start time.

Figure 5:
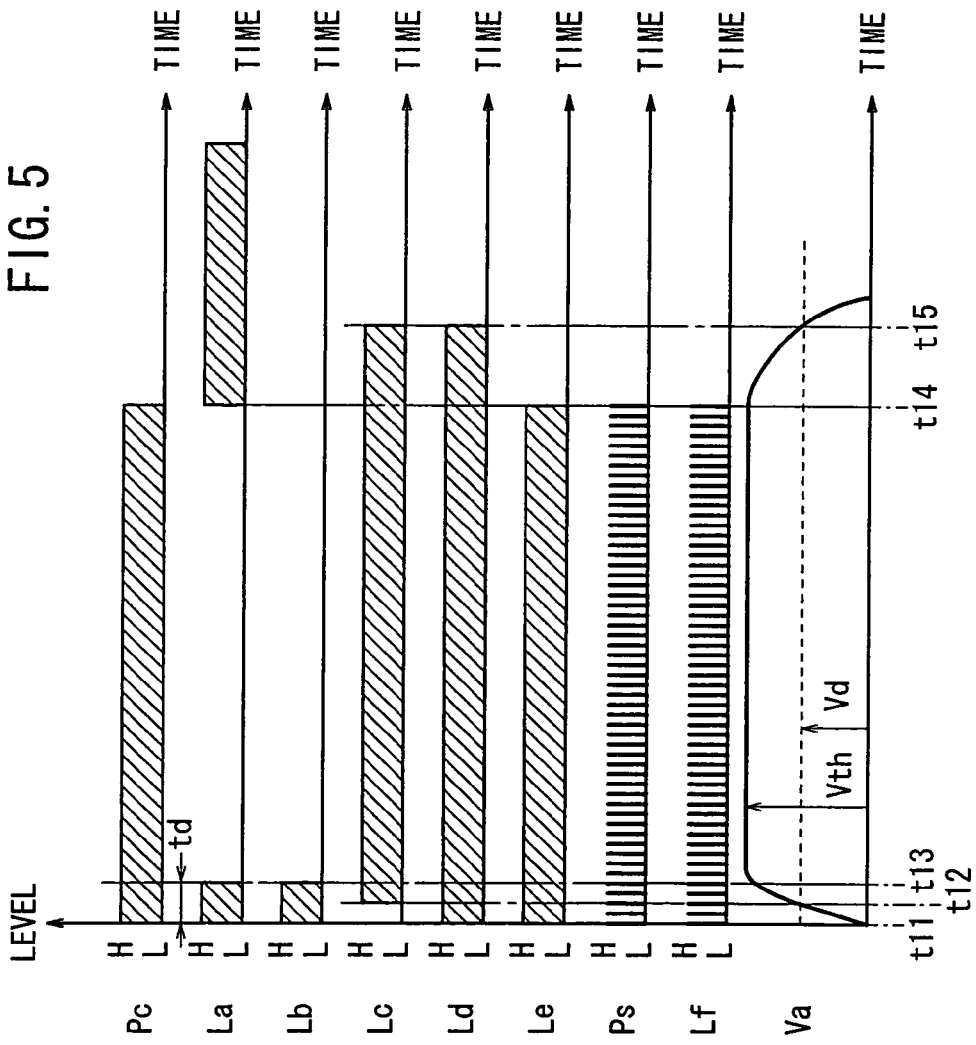
FIG. 5 is a waveform diagram showing normal operation of the high-voltage pulse generating circuit according to the example.
Figure 6:
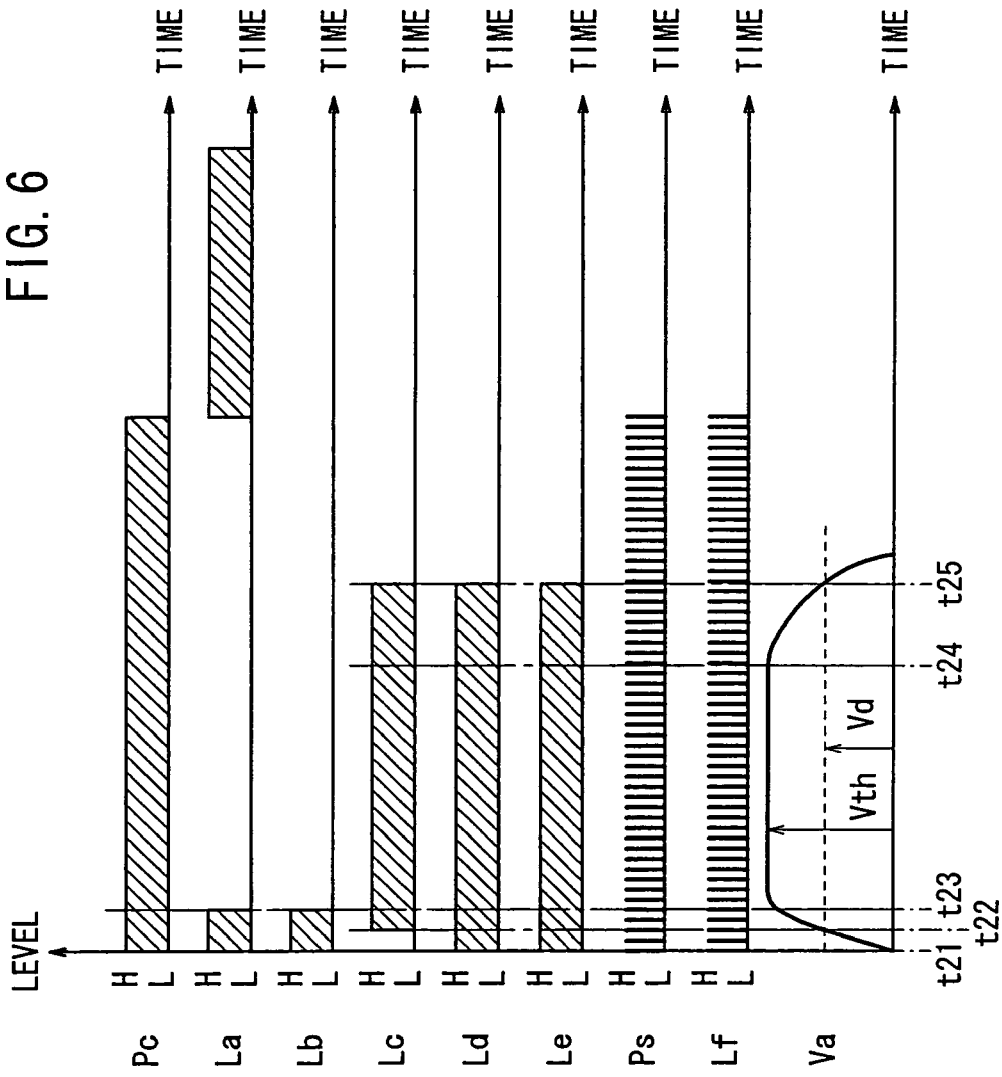
FIG. 6 is a waveform diagram showing abnormal operation of the high-voltage pulse generating circuit according to the example.
Figure 7:
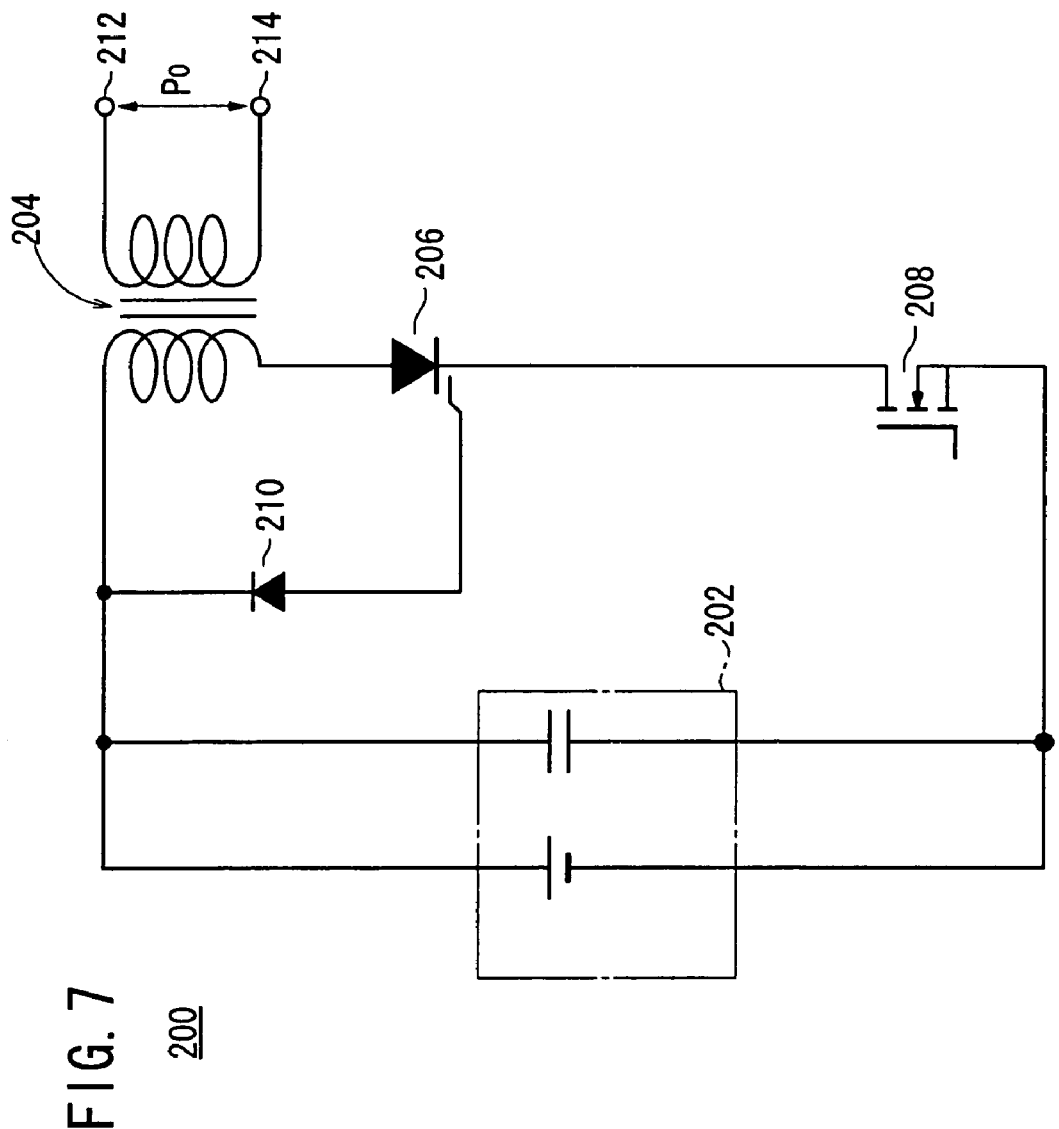
FIG. 7 is a circuit diagram of a conventional high-voltage pulse generating circuit.

An example of the high-voltage pulse generating circuit 10 according to the present embodiment will be described below with reference to FIGS. 4 through 6.

Figure 4:
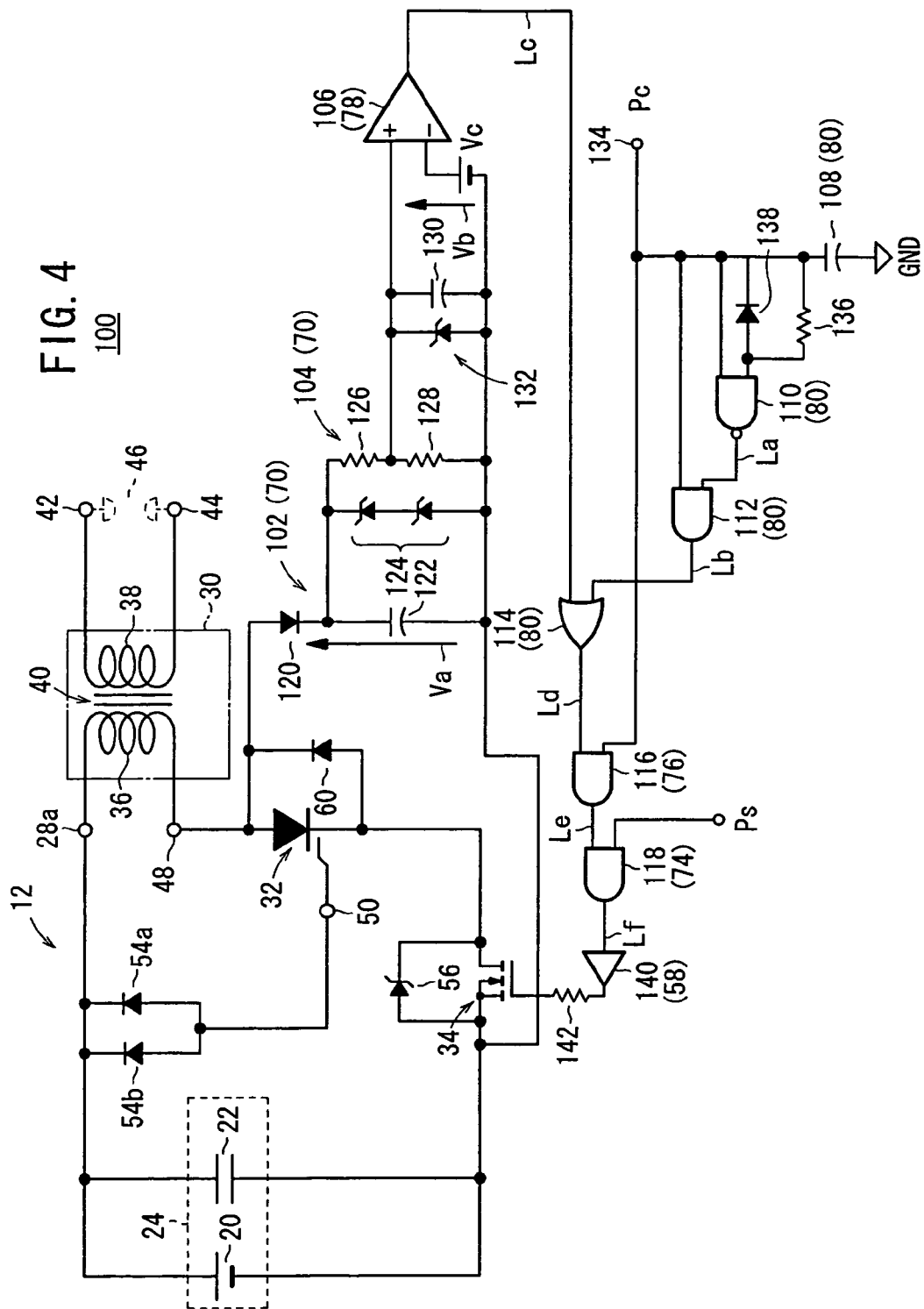
FIG. 4 is a circuit diagram showing an arrangement of a high-voltage pulse generating circuit according to an example.

As shown in FIG. 4, a high-voltage pulse generating circuit 100 according to the example has a snubber circuit 102 and an excessive voltage detecting circuit 104 connected parallel to the snubber circuit 102, as the detecting circuit 70 connected parallel to the first semiconductor switch 32 and the second semiconductor switch 34.

A comparator 106 as the comparing circuit 78 of the determining circuit 72 is connected to a subsequent stage of the excessive voltage detecting circuit 104. The high-voltage pulse generating circuit 100 also has a capacitor 108, a NAND circuit 110, an AND circuit 112, and an OR circuit 114 as the adjusting circuit 80 of the determining circuit 72.

The high-voltage pulse generating circuit 100 also has an AND circuit 116 connected to a subsequent stage of the OR circuit 114 as the second gate circuit 76, and an AND circuit 118 connected to a subsequent stage of the AND circuit 116 as the first gate circuit 74.

The snubber circuit 102 comprises a voltage-clamping snubber circuit having a series-connected circuit of a snubber diode 120 and a capacitor 122 which are connected parallel to the first semiconductor switch 32 and the second semiconductor switch 34, and a surge absorber 124 connected parallel to the capacitor 122 of the series-connected circuit. The snubber diode 120 has an anode connected to the anode terminal of the first semiconductor switch 32 and a cathode connected to the capacitor 122. A resistor may be connected instead of the snubber diode 120. The surge absorber 124 connected parallel to the capacitor 122 refers to a semiconductor surge absorber such as a zener diode or an excessive voltage suppressing device such as a varistor, an arrester, or the like.

When the main circuit 12 is in normal operation, insofar as the capacitor 122 of the voltage-clamping snubber circuit 102 is charged, no current flows through the capacitor 122 up to the voltage thereacross. Stated otherwise, the capacitor 122 does not need to be charged at all times, and the snubber circuit 102 can generate a pulse voltage at a high voltage rise ratio (dv/dt). The snubber circuit 102 is also advantageous in that it does not need extra energy for charging the capacitor 122.

The excessive voltage detecting circuit 104 has a series-connected circuit of two resistors (first and second resistors 126, 128) connected parallel to the surge absorber 124. A capacitor 130 may be connected parallel to the second resistor 128, providing a low-pass filter for a noise-resistant circuit arrangement. The capacitor 130 may function as a latch circuit for holding the voltage across the second resistor 128 for a predetermined time. A protective circuit 132 comprising a zener diode or the like may be connected between the second resistor 128 and the capacitor 130. The description which follows is mainly based on the arrangement that the capacitor 130 is connected parallel to the second resistor 128. Of course, the capacitor 130 may not be connected.

The comparator 106 has a positive terminal supplied with the output voltage Vb from the capacitor 130 and a negative terminal supplied with the prescribed voltage Vc. If the output voltage Vb from the capacitor 130 is higher than the prescribed voltage Vc, then the comparator 106 outputs a high-level signal (the energization signal Sd). If the output voltage Vb from the capacitor 130 is equal to or lower than the prescribed voltage Vc, then the comparator 106 outputs a low-level signal (the de-energization signal Sn). The prescribed voltage Vc is equal to the voltage Vb across the capacitor 130 when the voltage Va across the capacitor 122 of the snubber circuit 102 is of a failure detecting level Vd (see FIG. 5). The failure detecting level Vd may be a voltage level which is one-half the maximum voltage Vth of the capacitor 122, for example.

The capacitor 108 of the adjusting circuit 80 is connected between an input terminal 134 that is supplied with the operation command signal Pc and GND (ground). The NAND circuit 110 has an input terminal supplied with the operation command signal Pc from the input terminal 134. A parallel-connected circuit of a resistor 136 and a diode 138 is connected between the input terminal 134 and the other input terminal of the NAND circuit 110. The diode 138 has an anode connected to the other input terminal of the NAND circuit 110 and a cathode connected to the input terminal 134. The AND circuit 112 has an input terminal supplied with the operation command signal Pc from the input terminal 134 and the other input terminal supplied with an output from the NAND circuit 110. The OR circuit 114 has an input terminal supplied with the output from the comparator 106 and the other input terminal supplied with an output from the AND circuit 112.

When the operation command signal Pc becomes high in level (at the operation start time), the NAND circuit 110 is supplied with a high-level input voltage and another low-level input voltage and outputs a high-level output voltage. The output voltage (high level) is maintained until the capacitor 108 is charged to a threshold voltage of the NAND circuit 110. When the capacitor 108 is charged to the threshold voltage of the NAND circuit 110, i.e., when the predetermined time td has elapsed, the other input voltage of the NAND circuit 110 becomes high in level, and the output voltage of the NAND circuit 110 becomes low in level. Therefore, the AND circuit 112 outputs a high-level signal for the predetermined time td from the operation start time. The predetermined time td may range, as shown in FIG. 5, from operation start time t11 to a time when the voltage Va across the capacitor 122 of the snubber circuit 102 exceeds a voltage level (failure detecting level Vd) corresponding to the prescribed voltage Vc. When the operation command signal Pc goes low in level (for de-energization), the output of the NAND circuit 110 goes high in level again. However, since the AND circuit 112 outputs a low-level signal, the output of the NAND circuit 110 is essentially irrelevant.

The AND circuit 116 as the second gate circuit 76 has an input terminal supplied with the output from the OR circuit 114 and the other terminal supplied with the operation command signal Pc from the input terminal 134.

The AND circuit 118 as the first gate circuit 74 has an input terminal supplied with an output from the AND circuit 116 and the other input terminal supplied with the switching command signal Pc. An output from the AND circuit 118 is supplied between the gate and source of the second semiconductor switch 34 through the gate drive circuit 58, which comprises an inverter 140, for example, and a resistor 142.

Circuit operation of the high-voltage pulse generating circuit 100 according to the example will be described below with reference to FIGS. 5 and 6.

First, operation of the high-voltage pulse generating circuit 100 when it normally operates (normal operation) will be described below with reference to FIG. 5.

At the operation start time t11, since the operation command signal Pc is high in level, the output La of the NAND circuit 110 and the output Lb of the AND circuit 112 go high in level. The output Ld of the OR circuit 114 and the output Le of the AND circuit 116 also go high in level. As a result, the output Lf of the AND circuit 118 changes in synchronism with the switching command signal Ps. That is, the AND circuit 118 equivalently outputs the switching command signal Ps. The switching command signal Ps is supplied as the switching pulse signal Vs through the inverter 140 and the resistor 142 to the second semiconductor switch 34.

The supply of the switching pulse signal Vs to the second semiconductor switch 34 repeatedly turns on and off the second semiconductor switch 34, and repeatedly turns on and off the first semiconductor switch 32. Therefore, the capacitor 122 of the snubber circuit 102 is charged until finally the voltage Va across the capacitor 122 actually becomes essentially the same as the voltage Va across the first semiconductor switch 32 and the second semiconductor switch 34, i.e., the maximum voltage Vth in the normal operation. Subsequently, the voltage Va across the capacitor 122 will be maintained as it is.

At time t12 when the voltage Va across the capacitor 122 exceeds the failure detecting level Vd, the output Lc of the comparator 106 goes high in level.

At time t13 when the predetermined time td elapses, both the output La of the NAND circuit 110 and the output Lb of the AND circuit 112 go low in level. Since the output Lc of the comparator 106 is high in level, the AND circuit 118 keeps outputting the switching command signal Ps.

At operation stop time t14, when the operation command signal Pc goes low in level, the output Le of the AND circuit 116 goes low in level. The output Lf of the AND circuit 118 also goes low in level, whereupon the AND circuit 118 does not output the switching command signal Ps. The second semiconductor switch 34 is not supplied with the switching pulse signal Vs, de-energizing the main circuit 12. Thereafter, the capacitor 122 is discharged, and the voltage Va across the capacitor 122 gradually drops. When the voltage Va across the capacitor 122 becomes equal to or lower than the failure detecting level Vd, both the output Lc of the comparator 106 and the output Ld of the OR circuit 114 go low in level.

Operation of the high-voltage pulse generating circuit 100 in case the first semiconductor switch 32 suffers a short-circuit failure (abnormal operation) will be described below with reference to FIG. 6.

Operation from time t21 to time t23 is the same as the above normal operation (see FIG. 5) from time t11 to time t13.

If the first semiconductor switch 32 suffers a short-circuit failure at time t24 after elapse of the predetermined time td in the operation period, then the capacitor 122 starts being discharged, and the voltage Va across the capacitor 122 gradually drops. At time t25 when the voltage Va across the capacitor 122 becomes equal to or lower than the failure detecting level Vd, both the output Lc of the comparator 106 and the output Ld of the OR circuit 114 go low in level. Therefore, the output Le of the AND circuit 116 goes low in level, and the output Lf of the AND circuit 118 goes low in level, whereupon the AND circuit 118 does not output the switching command signal Ps. The second semiconductor switch 34 is not supplied with the switching pulse signal Vs, de-energizing the main circuit 12.

As described above, even if the first semiconductor switch 32 suffers a short-circuit failure for some reason, the high-voltage pulse generating circuit 100 according to the present example is capable of promptly detecting the short-circuit failure and de-energizing the main circuit 12.

According to the present example, particularly, since the snubber circuit 102 for preventing an excessive voltage from being applied to the first semiconductor switch 32 is used as the detecting circuit 70, an excessive voltage can be avoided and a short-circuit failure can be detected. Therefore, the high-voltage pulse generating circuit 100 which is highly safe is provided.

The high-voltage pulse generating circuit according to the present invention is not limited to the above embodiment, but may employ various arrangements without departing from the scope of the invention.

The invention claimed is:

1. A high-voltage pulse generating circuit having an inductor, a first semiconductor switch, and a second semiconductor switch which are connected in series with each other across a DC power supply unit, and a diode having a cathode terminal connected to an end of said inductor whose other end is connected to an anode terminal of said first semiconductor switch, and an anode terminal connected to a gate terminal of said first semiconductor switch, wherein an induced energy is stored in said inductor when said first semiconductor switch is rendered conductive as said second semiconductor switch is turned on, and said inductor generates a high-voltage pulse when said first semiconductor switch is turned off as said second semiconductor switch is turned off, wherein:
   a failure diagnosing circuit de-energizes said second semiconductor switch if the voltage across said first semiconductor switch and said second semiconductor switch falls out of a normal range.

2. A high-voltage pulse generating circuit according to claim 1, comprising:
   a drive circuit for turning on and off said second semiconductor switch at a predetermined switching frequency based on a switching command signal applied thereto;
   wherein said failure diagnosing circuit inhibits said switching command signal from being applied to said drive circuit if the voltage across said first semiconductor switch and said second semiconductor switch falls out of the normal range.

3. A high-voltage pulse generating circuit according to claim 2, wherein said failure diagnosing circuit comprises:
   a detecting circuit for detecting the voltage across said first semiconductor switch and said second semiconductor switch;
   a determining circuit for comparing a detected voltage from said detecting circuit with a preset prescribed voltage, outputting an energization signal if said detected voltage is higher than said prescribed voltage, and outputting a de-energization signal if said detected voltage is equal to or lower than said prescribed voltage; and
   a gate circuit for inhibiting said switching command signal from being applied to said drive circuit based on the de-energization signal applied thereto from said determining circuit.

4. A high-voltage pulse generating circuit according to claim 3, wherein said detecting circuit comprises:
   a voltage-clamping snubber circuit having a snubber diode and a snubber capacitor which are connected in series with each other across said first semiconductor switch and said second semiconductor switch, and a surge absorber connected parallel to said snubber capacitor;
   wherein said detecting circuit extracts a voltage across said snubber capacitor or said surge absorber as said detected voltage.

5. A high-voltage pulse generating circuit according to claim 3, comprising:
   a second gate circuit for transmitting an output from said determining circuit to said gate circuit from an operation start time of said high-voltage pulse generating circuit based on an operation command signal applied thereto to an operation stop time of said high-voltage pulse generating circuit.

6. A high-voltage pulse generating circuit according to claim 5, wherein said determining circuit comprises:
   an adjusting circuit for forcibly outputting said energization signal for a predetermined time from the operation start time of said high-voltage pulse generating circuit based on the operation command signal applied thereto.

7. A high-voltage pulse generating circuit according to claim 1, wherein said first semiconductor switch comprises a static induction thyristor.

8. A high-voltage pulse generating circuit according to claim 1, wherein said second semiconductor switch comprises a power metal oxide semiconductor field-effect transistor.

* * * * *